(12) United States Patent
Mackintosh

(10) Patent No.: US 9,683,328 B2
(45) Date of Patent: Jun. 20, 2017

(54) PREPARATION OF BIOFUELS AND OTHER USEFUL PRODUCTS SUCH AS 5-(HYDROXYMETHYL)-FURFURAL

(75) Inventor: Alexis Fosse Mackintosh, Vancouver (CA)

(73) Assignee: EVE RESEARCH INC., Vancouver, BC (CA)

( * ) Notice: Subject to any disclaimer, the term of this patent is extended or adjusted under 35 U.S.C. 154(b) by 160 days.

(21) Appl. No.: 13/266,859

(22) PCT Filed: Apr. 30, 2010

(86) PCT No.: PCT/CA2010/000647
§ 371 (c)(1),
(2), (4) Date: Oct. 28, 2011

(87) PCT Pub. No.: WO2010/124381
PCT Pub. Date: Nov. 4, 2010

(65) Prior Publication Data
US 2012/0042566 A1    Feb. 23, 2012

Related U.S. Application Data

(60) Provisional application No. 61/174,466, filed on Apr. 30, 2009, provisional application No. 61/182,378, filed on May 29, 2009.

(51) Int. Cl.
*C10L 5/36*    (2006.01)
*C08F 124/00*    (2006.01)
(Continued)

(52) U.S. Cl.
CPC .............. *D21C 3/04* (2013.01); *C08H 8/00* (2013.01); *C10G 1/065* (2013.01); *C10L 5/02* (2013.01);
(Continued)

(58) Field of Classification Search
USPC ....... 241/17; 44/589, 530; 526/270; 549/488
See application file for complete search history.

(56) References Cited

U.S. PATENT DOCUMENTS 3,034,994 A * 5/1962 Braithwaite et al. ........... 502/63
3,473,494 A   10/1969 Siracusa
(Continued)

FOREIGN PATENT DOCUMENTS

CA    1181397    *    1/1985
CA    1181397 A1    1/1985
(Continued)

OTHER PUBLICATIONS

Takeuchi, Y. et al., "Acid catalytic hydrothermal conversion of carbohydrate biomass into useful substances", J Mater Sci (2008) 43:2472-2475.
(Continued)

*Primary Examiner* — Prem C Singh
*Assistant Examiner* — Chantel Graham
(74) *Attorney, Agent, or Firm* — Oyen Wiggs Green & Mutala LLP

(57) ABSTRACT

Polycarbon biofuels may be made from feedstock such as wood waste, agricultural wastes and waste paper. The feedstock may be cooked under acidic conditions to convert cellulose and similar material in the feedstock into a biofuel that is hydrophobic, readily pelletized, and has a high energy density. The biofuel may be blended with coal or other fuels to provide blended fuels that may be burned in conventional burners. One process forms a slurry of the feedstock, sparges carbon dioxide through the slurry to achieve a pH below 5 and cooks the slurry at temperatures in the range of 170 C to 300 C until conversion of the feedstock to polycarbon biofuel has occurred. The biofuel may be separated from liquids in the slurry by filtration.

18 Claims, 8 Drawing Sheets

(51) Int. Cl.
*C07D 307/46* (2006.01)
*D21C 3/04* (2006.01)
*C10L 5/44* (2006.01)
*C10G 1/06* (2006.01)
*C10L 5/02* (2006.01)
*C10L 9/08* (2006.01)
*C08H 8/00* (2010.01)

(52) U.S. Cl.
CPC .............. *C10L 5/363* (2013.01); *C10L 5/447* (2013.01); *C10L 9/086* (2013.01); *C10G 2300/1014* (2013.01); *C10G 2300/805* (2013.01); *Y02E 50/10* (2013.01); *Y02E 50/30* (2013.01); *Y02P 30/20* (2015.11)

(56) References Cited

U.S. PATENT DOCUMENTS

| | | | |
|---|---|---|---|
| 3,584,587 A | | 6/1971 | Siracusa |
| 3,721,576 A | * | 3/1973 | Jarowenko .................... 503/221 |
| 3,961,913 A | | 6/1976 | Brenneman et al. |
| 4,063,903 A | | 12/1977 | Beningson et al. |
| 4,152,119 A | | 5/1979 | Schulz |
| 4,225,457 A | | 9/1980 | Schulz |
| 4,278,471 A | | 7/1981 | Whittingham |
| 4,281,063 A | * | 7/1981 | Tsao et al. ...................... 435/99 |
| 4,416,721 A | | 11/1983 | Deregibus |
| 4,416,727 A | | 11/1983 | Elton et al. |
| 4,496,365 A | | 1/1985 | Lindemann |
| 4,661,119 A | | 4/1987 | Andersson et al. |
| 5,100,066 A | | 3/1992 | Frei |
| 5,429,645 A | | 7/1995 | Benson et al. |
| 5,431,702 A | | 7/1995 | Schulz |
| 5,562,743 A | | 10/1996 | Daugherty et al. |
| 5,762,656 A | * | 6/1998 | Burke et al. ...................... 44/589 |
| 5,779,164 A | * | 7/1998 | Chieffalo et al. ............... 241/17 |
| 5,888,256 A | | 3/1999 | Morrison |
| 6,113,662 A | | 9/2000 | Sprules |
| 6,458,240 B1 | | 10/2002 | Bouchette et al. |
| 6,464,827 B1 | | 10/2002 | Colodette |
| 6,506,223 B2 | * | 1/2003 | White .............................. 44/551 |
| 7,252,691 B2 | | 8/2007 | Philipson |
| 2008/0295980 A1 | * | 12/2008 | Hallberg et al. ................. 162/14 |
| 2009/0030215 A1 | * | 1/2009 | Dignan et al. ................. 549/488 |
| 2010/0154296 A1 | | 6/2010 | Malhotra |
| 2010/0221805 A1 | * | 9/2010 | Kelly ............................ 435/165 |
| 2012/0063969 A1 | * | 3/2012 | Cornish et al. ............... 422/261 |

FOREIGN PATENT DOCUMENTS

| | | |
|---|---|---|
| JP | 09-507386 | 7/1997 |
| JP | 2001-172655 | 6/2001 |
| JP | 2008-514207 | 9/2005 |
| JP | 2007-145736 | 6/2007 |
| WO | 8701402 | 3/1987 |
| WO | WO2007111605 * | 4/2007 |
| WO | 2008/090804 | 7/2008 |
| WO | 2008095349 A1 | 8/2008 |
| WO | 2009018469 A1 | 2/2009 |
| WO | 2009127727 A1 | 10/2009 |
| WO | 2010006881 A1 | 1/2010 |

OTHER PUBLICATIONS

Office Action issued Aug. 12, 2014 on JP 2012-507549.
Office Action issued Aug. 26, 2014 on JP 2012-507548.
Examiner's Report from Canadian Intellectual Property Office dated Apr. 15, 2016.
Examiner's Report from Canadian Intellectual Property Office dated Oct. 20, 2016.
Supplementary European Search Report and Communication from European Patent Office on EP2425051.

* cited by examiner

PREPARATION OF BIOFUELS AND OTHER USEFUL PRODUCTS SUCH AS 5-(HYDROXYMETHYL)-FURFURAL

CROSS-REFERENCE TO RELATED APPLICATIONS

This application claims priority from U.S. application No. 61/174,466 filed on 30 Apr. 2009 and entitled PROCESS AND APPARATUS FOR RECYCLING COATED PAPER PRODUCTS and U.S. application No. 61/182,378 filed on 29 May 2009 and entitled PREPARATION OF 5-(HYDROXYMETHYL)-FURFURAL DERIVATIVES AND OTHER PRODUCTS which are both hereby incorporated herein by reference. For purposes of the United States of America, this application claims the benefit under 35 U.S.C. §119 of U.S. application No. 61/174,466 filed on 30 Apr. 2009 and entitled PROCESS AND APPARATUS FOR RECYCLING COATED PAPER PRODUCTS and U.S. application No. 61/182,378 filed on 29 May 2009 and entitled PREPARATION OF 5-(HYDROXYMETHYL)-FURFURAL DERIVATIVES AND OTHER PRODUCTS both of which are hereby incorporated herein by reference.

TECHNICAL FIELD

This invention relates to methods of producing useful materials by chemical conversion of sugars, sugar sources, polysaccharides (e.g. cellulose, cellulose derivatives). Some embodiments provide methods and apparatus for producing biofuels from carbon-containing materials such as wood, paper, manure, food wastes and the like. Some embodiments provide methods and apparatus for producing 5-(hydroxymethyl)-furfural and related materials from one or more sugars or one or more sugar sources. This invention also relates to methods for recycling waste polysaccharides.

BACKGROUND

There is a need for new sources of energy. Biofuels have been touted as possible replacements for fossil fuels such as coal and oil. For example, millions of dollars have been invested in developing technologies for the production of ethanol from corn and other kinds of plants. However, ethanol can be expensive to produce and is not an ideal fuel for many applications.

Disposing of solid waste is another problem faced by many municipalities and other government authorities. Waste polysaccharides, such as cellulose fibers from waste paper, are for various reasons, often excluded from recycling programs. This leads to the accumulation of waste in landfills. Incineration of raw garbage is increasingly being considered as landfill sites are becoming full. However, incineration can be polluting and has faced public opposition in many places. Schemes to convert garbage into ethanol or other liquid fuels have been proposed. However, as noted above, ethanol is not an ideal fuel for many applications.

5-hydroxymethyl-furfural, also known as 5-(hydroxymethyl)furan-2-carbaldehyde or 5-(hydroxymethyl)-2-furaldehyde (HMF) has many industrial and commercial uses. HMF can be used as a precursor in many polymerization reactions. HMF can also be used to produce surfactants, solvents, pharmaceuticals and fungicides.

HMF can be produced from the dehydration of a carbohydrate. However, reaction conditions used in the prior art favor the subsequent conversion of HMF to by-products such as levulinic acid and formic acid, so the yield of HMF is often low. Competing side reactions that yield humins may also reduce the yield of HMF.

Some publications in the field of converting garbage to fuels include: U.S. Pat. Nos. 7,252,691; 3,473,494; 3,584,587; 3,961,913; 4,152,119; 4,225,457; 4,496,365; 4,661,119; 5,100,066; 5,429,645; 5,431,702; 5,562,743; 5,779,164; 5,888,256; 6,113,662; 6,506,223.

There is a need for cost-effective and environmentally friendly ways to address the above issues individually or collectively.

SUMMARY

The invention has a number of aspects that may be exploited individually or in combination.

One aspect of the invention provides a method for producing a solid fuel from input materials comprising one or more of: polysaccharides (such as cellulose, hemicellulose or related materials), lignin, sugars or sugar precursors. The method may, by way of non-limiting example, take as a feedstock one or more of: wood chips (for example, sawdust, decadent hemlock, beetle-killed pine trees, bark, chips of pine, hemlock, cedar, birch, alder, aspen, balsam etc., forest cuttings, branches and leaves, wood demolition waste), pulp, paper, plant biomass (for example, water hyacinth, milfoil weeds, grasses, including but not limited to marine plants, algae, cyano-bacteria), agricultural wastes (for example straw, plant cuttings, corn stover, corn cobs, animal manure including but not limited to horse, cow and pig manure, bagasse, oil palm trunks, rice husks), municipal wastes (for example food waste, yard waste, coffee grounds, kitchen waste, paper-based disposable cups and plates, waste paper, waste cardboard), food packaging (for example, juice containers, coated cardboard drinking cups), sewage sludge, brewers waste, any mixtures of the above and the like. The method involves providing a slurry of the feedstock and heating the slurry under acidic conditions. In some embodiments one or more weak organic acids are present in the slurry. In an embodiment, the one or more weak organic acids comprise an acid having a pKa in the range of 1.5 to 3.85. In a specific embodiment the acid is maleic acid. In an alternative specific embodiment, the acid is malonic acid. In some embodiments $CO_2$ gas is present during treatment of the slurry. For example, heating of the slurry may be performed in an atmosphere consisting of or enriched in $CO_2$ gas and/or $CO_2$ gas may be sparged through the slurry prior to or during heating of the slurry. In some embodiments both $CO_2$ and one or more weak organic acids are present during heating of the slurry.

In some embodiments, treatment of the feedstock is performed on a batch basis. An aqueous slurry containing the feedstock is introduced into a pressure vessel. An acid (in some embodiments a weak organic acid) is present in or mixed into the feedstock and/or $CO_2$ is introduced into the pressure vessel. The pressure vessel is heated to maintain it at an elevated temperature and pressure for sufficient time for cellulose and/or other polysaccharides and/or sugars in the feedstock to react to form a polymeric solid material. The contents of the pressure vessel are then filtered to recover the solid material which can be dried and pelletized to provide a solid fuel. Other embodiments provide continuous processes.

In some embodiments the polymeric solid material is pelletized together with coal or another solid fuel material to provide a hybrid fuel. Advantageously, the polymeric solid fuel may be hydrophobic. Advantageously, the polymeric solid fuel may contain oxygen.

In some embodiments, processing temperatures are less than 300° C. In some embodiments processing pressures are less than 800 psi.

In some embodiments the polymeric solid fuel becomes substantially completely volatized at temperatures of 500° C. or below. In some embodiments the polymeric solid fuel leaves residual ash of less than ½% by weight after combustion in air.

In some embodiments the polymeric solid fuel has an energy density of at least 25 GJ/tonne.

In some embodiments, drying to a low moisture content (e.g. a moisture content of 5% or less is facilitated by the hydrophobic nature of the solid polymeric fuel and may be achieved through practical energy efficient dewatering steps such as filtering, pressing and air drying.

Another aspect of the invention provides a method of preparing HMF. The method involves heating one or more sugars with one or more weak organic acids at a temperature and for a period of time that is sufficient to dehydrate the sugars, yielding HMF. In an embodiment, the one or more weak organic acids comprise an acid having a pKa in the range of 1.5 to 3.85. In a specific embodiment the acid is maleic acid. In an alternative specific embodiment, the acid is malonic acid. The HMF may be separated from other side products, if present, and/or may be purified.

Another aspect of the invention provides a method of preparing HMF. The method involves heating one or more sugar sources with one or more weak organic acids at a temperature and for a period of time that is sufficient to hydrolyze the sugar source to yield one or more sugars and to then dehydrate the one or more sugars to yield HMF. The sugar source may comprise one or more polysaccharides, for example. In an embodiment, the one or more weak organic acids comprise an acid having a pKa in the range of 1.5 to 3.85. For example, the one or more weak organic acids may comprise maleic acid and/or malonic acid. The HMF may be separated from other side products, if present, and/or may be purified.

Another aspect of the invention provides apparatus for use in the preparation of solid fuels, HMF, and/or other materials such as levoglucosan (1,6-anhydro-b-D-glucopyranose) according to methods as described herein.

Further aspects of the invention and specific example embodiments of the invention are described below and/or illustrated in the accompanying drawings.

BRIEF DESCRIPTION OF THE DRAWINGS

The accompanying drawings illustrate non-limiting example embodiments of the invention.

DESCRIPTION

Throughout the following description, specific details are set forth in order to provide a more thorough understanding of the invention. However, the invention may be practiced without these particulars. In other instances, well known elements may not have been shown or described in detail to avoid unnecessarily obscuring the disclosure. Accordingly, the description and drawings are to be regarded in an illustrative, rather than a restrictive, sense.

Figure 1:
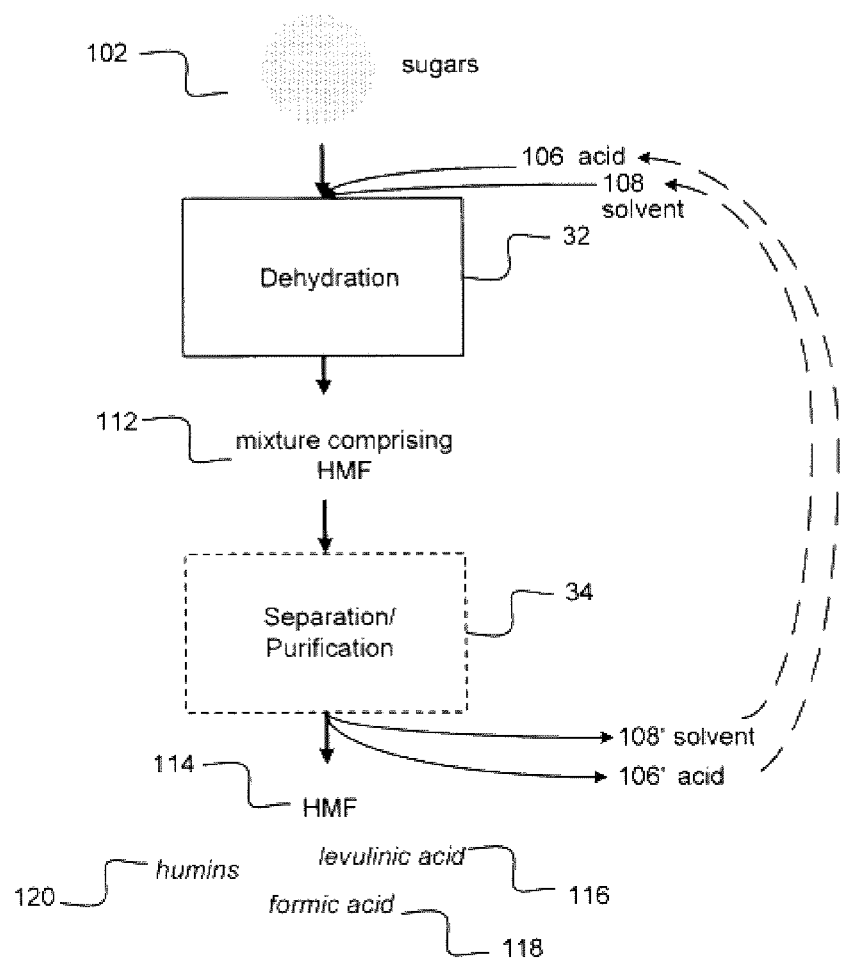
FIG. 1 is a block process diagram according to an example embodiment of the invention.

FIG. 1 is a block process diagram of a method 10 according to an example embodiment of the invention. Sugars 102 are mixed with acid 106 and optionally, one or more solvents 108 in dehydration stage 32. The mixture is heated to a temperature and for a period of time that is sufficient to dehydrate the sugars, yielding a mixture 112 comprising HMF. Optionally, mixture 112 may be separated and/or purified in separation/purification stage 34 to yield HMF 114. Other products, such as levulinic acid 116, formic acid 118 and humins 120 may optionally be collected, if present. In some embodiments the end product materials comprise polymeric carbon-containing compounds that are useful as solid fuels.

Sugars 102 may comprise one or more hexoses. In an example embodiment, sugars 102 predominantly comprise glucose. However, sugars 102 may additionally or alternatively comprise other hexoses, such as fructose, mannose, galactose, or a combination of these. Alternatively or additionally, sugars 102 may comprise one or more pentoses. If sugars 102 comprise one or more pentoses, mixture 112 may comprise furfural.

Optional solvent 108 may comprise one or more liquids. In an example embodiment, solvent 108 comprises water. However, solvent 108 may additionally or alternatively comprise other liquids, such as suitable organic solvents. Some examples of suitable non-aqueous solvents are methyl ethyl ketone and ethyl acetate.

Acid 106 may comprise one or more weak organic acids. In an example embodiment, acid 106 comprises maleic acid. In other embodiments, other organic acids having a pKa in the range of 1.5 to 3.85 are used. In a particular embodiment, acid 106 comprises an acid having a pKa in the range of 1.85 to 3.0. For example, acid 106 may, alternatively or additionally, comprise malonic acid.

In dehydration stage 32, sugars 102, acid 106 and optionally, solvent 108 are combined. In this mixture, sugars 102 may be present, for example, in a range of concentrations. Acid 106 may also be present in a range of concentrations. In an example embodiment, acid 106 is present in a concentration of 50 mM.

The mixture is heated at a temperature and for a period of time that is sufficient to dehydrate and convert sugars 102 to HMF. In an example embodiment, the mixture is heated to a temperature in the range of 170° C. to 220° C. at a pressure in the range of 50 p.s.i. to 300 p.s.i. However, the mixture may be heated to other temperatures and at other pressures that are sufficient to convert sugars 102 to the desired yield of HMF. For example, in some embodiments temperatures are in the range of 170° C. to 250° C. and pressures are in the range of 50 psi to 800 psi. The mixture is heated for a period of time that is sufficient to convert sugars 102 to the desired yield of HMF (or other desired end products). In an example embodiment, the mixture is heated for a period of time in the order of minutes to a few hours. Optionally, the mixture may be heated under stirring or agitation.

The product of dehydration stage 32 is a mixture 112 comprising HMF. Mixture 112 may predominantly comprise HMF. Mixture 112 may be a solution. Mixture 112 may additionally comprise other products, such as levulinic acid, formic acid and humins. Optionally, mixture 112 may be separated and/or purified in separation/purification stage 34 to yield HMF 114 and optionally, one or more of levulinic acid 116, formic acid 118, humins 120, acid 106' and solvent 108'.

Separation/purification stage 34 may include filtration, solvent extraction, column chromatography, distillation (for example, vacuum distillation), and/or high performance chromatography, for example. HMF 114 and optionally, one or more of levulinic acid 116, formic acid 118 and humins, 120 may be taken off. Optionally, one or more of these products may be purified after being taken off.

Acid 106' may optionally be recycled to dehydration stage 32. Optionally, acid 106' may be purified and/or reconstituted prior to recycling. For example, acid 106' may be purified using column chromatography or high performance chromatography. Solvent 108' may optionally be recycled to dehydration stage 32. Optionally, solvent 108' may be purified prior to recycling.

Figure 2:
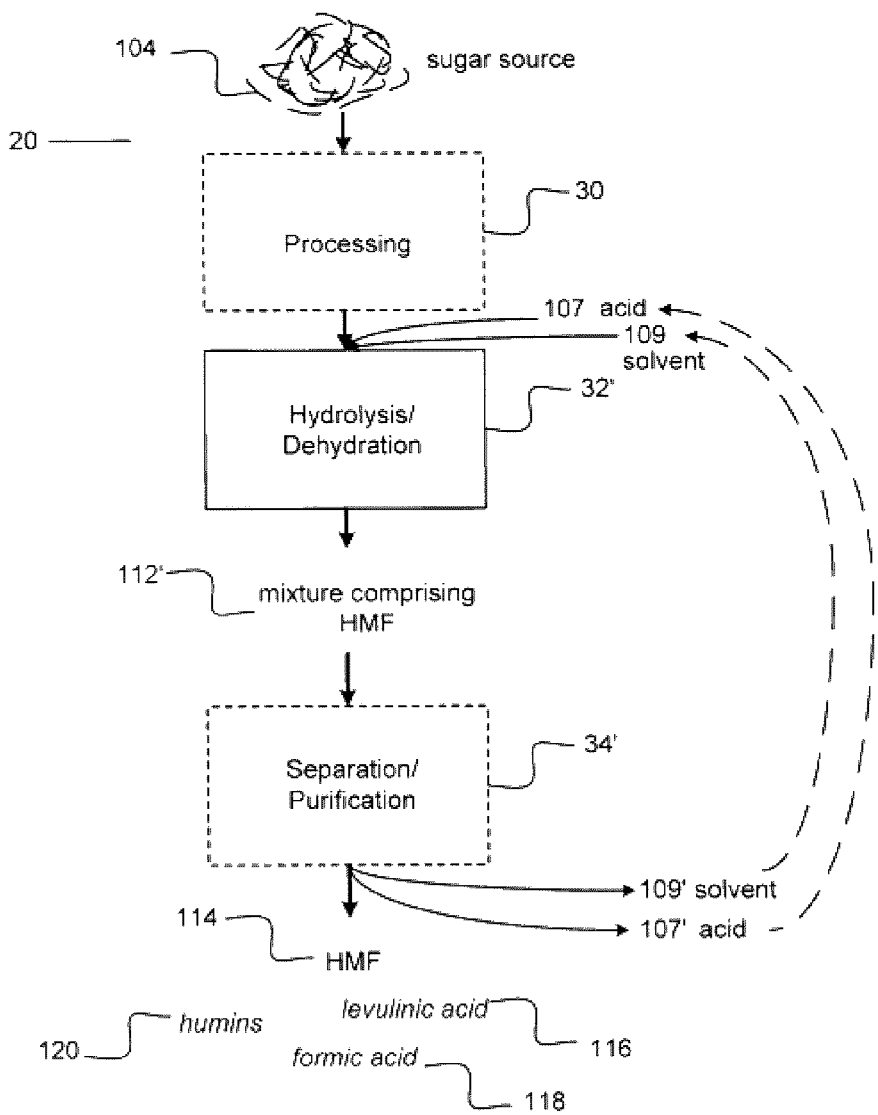
FIG. 2 is a block process diagram according to a second example embodiment of the invention.

FIG. 2 is a block process diagram of a method 20 according to an alternative example embodiment of the invention. A sugar source 104 is submitted to hydrolysis/dehydration stage 32'. Optionally, sugar source 104 may be processed in processing stage 30 prior to hydrolysis/dehydration stage 32'. In hydrolysis/dehydration stage 32' sugar source 104 is combined with acid 107 and optionally, one or more solvents 109. The mixture is heated to a temperature and for a period of time that is sufficient to hydrolyze the sugar source to yield sugars and to dehydrate the sugars to yield a mixture 112' comprising HMF. Optionally, mixture 112' may be separated and/or purified in separation/purification stage 34' to yield HMF 114. Other products, such as levulinic acid 116, formic acid 118 and humins 120 may optionally be collected.

Sugar source 104 may comprise one or more carbohydrates. For example, sugar source 104 may comprise one or more polysaccharides. In an example embodiment, sugar source 104 comprises cellulose fibers. For example, the cellulose fibers may comprise secondary fibers from waste paper products. In an alternative example embodiment, sugar source 104 comprises cellulose or lignocellulose obtained from wood chips or ground wood. In another alternative example embodiment, sugar source 104 comprises a starch. Sugar source 104 may comprise other materials that can be broken down to yield sugars.

Optional processing stage 30 alters sugar source 104 so that it is more readily hydrolyzed to yield sugars. Processing stage 30 may comprise one or more steps. For example, processing stage 30 may comprise a mechanical process that shortens or cuts polysaccharide fibers, for example, by grinding in a knife mill. In another example embodiment, processing stage 30 comprises beating or refining polysaccharide fibers to improve the penetration of acid 107 and/or solvent 109.

Acid 107 may comprise one or more weak organic acids. In an example embodiment, acids 107 comprise a weak organic acid having a pKa in the range of 1.5 to 3.85. In a particular example embodiment, acid 107 comprises an weak organic acid having a pKa in the range of 1.85 to 3.0. Sugar source 104, acid 107 and optionally, solvent 109 are combined in dehydration stage 32. The mixture is heated to a temperature and for a period of time that is sufficient to hydrolyze the sugar source to yield sugars and to dehydrate the sugars, converting them to HMF and potentially, other products. The relative yields of the products in mixture 112' will depend on the acid 107, the temperature and the period of heating.

Figure 3:
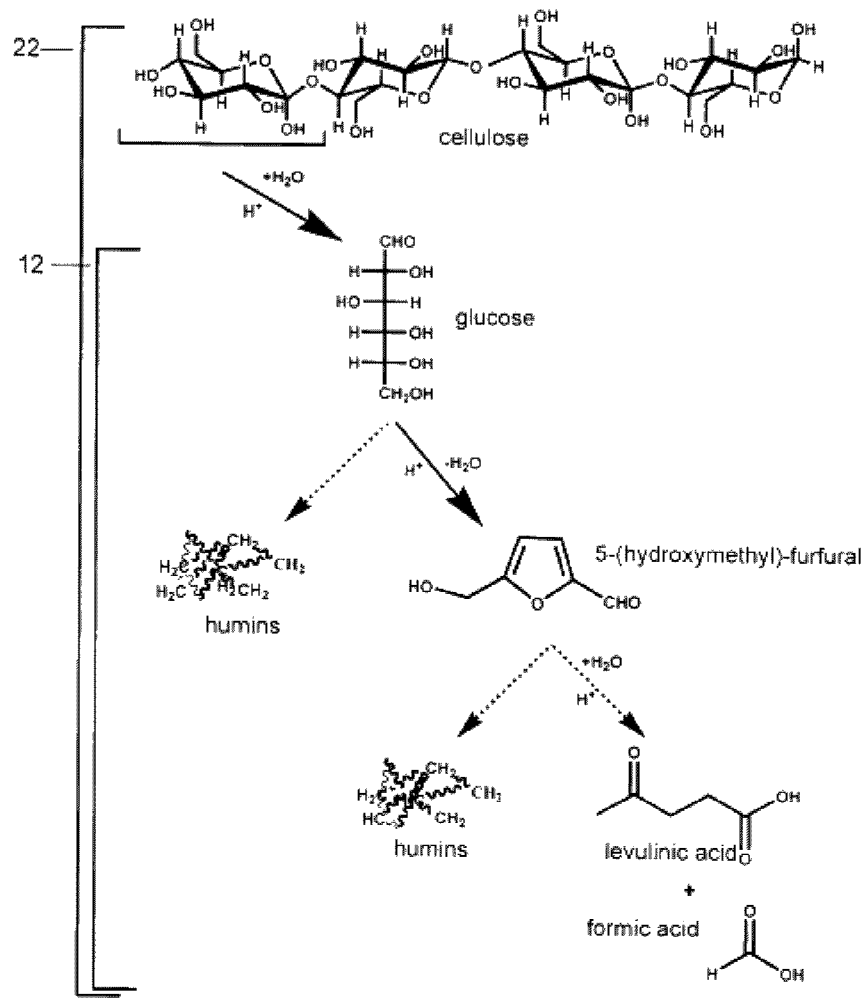
FIG. 3 is an illustration of the reactions involved in one possible arrangement for the hydrolysis/dehydration stage of FIG. 2.

FIG. 3 illustrates the reaction scheme 12 involved in one possible arrangement for dehydration stage 32 and reaction scheme 22 involved in one possible arrangement for hydrolysis/dehydration stage 32', along with potentially competing side reactions. In these example embodiments, sugar source 102 comprises glucose and sugar source 104 comprises cellulose.

In reaction scheme 22, the cellulose is hydrolyzed into its component glucose units. Subsequently and/or concurrently, the glucose units are dehydrated to yield HMF. In reaction scheme 12, glucose is dehydrated to yield HMF. In both reaction schemes, if levulinic acid is a desired product and/or the reaction conditions are not optimized to produce HMF, a substantial amount of the HMF may be rehydrated to yield levulinic acid and formic acid. In other instances where the reaction conditions are not optimized to produce HMF, the glucose and/or the HMF may polymerize to produce humins.

The relative yields of HMF, levulinic acid and humins in mixture 112 or 112' may be adjusted by varying the acid, temperature and duration of heating. If acid 106 or 107 comprises a strong acid (for example, an acid with a pKa below 1), the rate of conversion of HMF to levulinic acid is high, and the predominant product is levulinic acid. If acid 106 or 107 comprises a very weak acid (for example, an acid with a pKa greater than 3.85), the conditions favor the polymerization of glucose to humins. In this example embodiment, acid 106 or 107 comprises a weak organic acid having a pKa in the range of 1.85 to 3.0, which favors the production of HMF over levulinic acid and humins. One such acid is maleic acid. In a particular example embodiment, maleic acid is obtained by combining maleic anhydride and water. Another such acid is malonic acid.

The cellulose is heated with acid 106 or 107 and optionally, solvent 108 or 109 for a period of time that is sufficient to hydrolyze the cellulose to glucose and dehydrate the glucose to HMF, but is insufficient to dehydrate a significant amount of the HMF to levulinic acid. For example, the reagents may be heated to a temperature in the range of 170° C. to 220° C. for a period of time in the range of minutes to 3 hrs. In an example embodiment, the reagents are heated to a temperature in the range of 200° C. to 210° C. for a period of time in the range of 30 min to 1 hr. In a particular example embodiment, cellulose is heated with maleic acid to a temperature of 200° C. for a period of 1 hr to produce a yield of HMF in the range of 30% to 40%.

In reaction scheme 22, the properties of sugar source 104 may also affect the relative yields of HMF, levulinic acid and humins in mixture 112'. The hydrolysis of cellulose provides a relatively slow release of sugars into the reaction solution, which favors the dehydration of sugars to HMF over the polymerization to humins.

In an example embodiment, 1.5 g of cellulose fiber was ground in a knife mill to yield cellulose fibers having an average diameter of 1 mm and an average length of 5 mm. The cellulose fibers were combined in a reaction vessel with 60 mL of 50 mM maleic acid for a fiber consistency of 2.5%. The vessel was heated to 210° C. for a period of 45 min to yield a mixture comprising HMF. The mixture was separated using a combination of filtration, solvent extraction and column chromatography. 0.9 g of HMF was obtained.

In an alternative embodiment, the conditions in reaction scheme 22 and/or 12 may be optimized to produce a mixture comprising predominantly humins. For example, with longer processing times, HMF is converted to humins. In a particular example embodiment, 60 g of cellulose fiber from waste paper was combined in a reaction vessel with 1 L of 50 mM maleic acid for a fiber consistency of 5.7%. The vessel was heated to a temperature of 200° C. for 5 hrs to yield a mixture comprised predominantly of humins. The humins were removed from the solution by vacuum filtration using Whatman' 42 filter paper and were dried to yield 48 g humins. The humins had an energy density of 18.2 megajoules per kilogram. Such humins may, for example, be used as a solid biofuel.

While the invention may be practiced in a variety of embodiments, some embodiments have certain advantages. For example, method 20 practiced with a sugar source 104 comprising cellulose and in particular, waste cellulose, provides an economical method of yielding HMF. Method 20 practiced with an acid 107 comprising hydrolyzed maleic anhydride also provides economic advantages. Such economic advantages are further realized by recycling acid 107 comprising maleic acid to hydrolysis/dehydration stage 32'.

In an example embodiment waste paper products are used as a source of cellulose. In such embodiments the waste paper may be shredded and/or pulped and then subjected to a first process step to hydrolyze the cellulose from the waste paper to yield sugars. The sugars are then subjected to a second process step to yield one or more of HMF, levulinic acid and humins, as described herein. In some embodiments the reaction conditions in the second process step are modified over time to selectively produce primarily HMF, levulinic acid and humins. In some embodiments the process conditions in the second process step are switched from conditions yielding primarily levulinic acid or humins to process conditions yielding primarily HMF or vice versa.

Other economic advantages are realized when the method is optimized to produce humins. For example, method 20 practiced with a sugar source 104 comprising cellulose from waste paper and reaction conditions that are favorable to the production of humins, provides a method of producing fuel from waste products. The humins produced are similar to brown coal that is used for electrical generation in coal burning power plants. Thus, one application of the methods described herein is the production of solid fuels from feedstocks of any of a wide variety of types.

In an example batch method for producing solid fuels from feedstocks (for example of the types described above) pulped feedstock is placed in a pressure vessel (a reactor) and either $CO_2$ is bubbled through the pulped feedstock or an acid is added to the pulped feedstock or both. In some embodiments the reactor is pressurized with $CO_2$ gas to a pressure in excess of 1 atmosphere prior to heating. The reactor is then heated to a suitable temperature (e.g. a temperature of at least about 180° C. and typically in the range of 180° C. to 250° C. or 300° C.). The desired temperature will depend on factors such as the pH of the pulped feedstock prior to heating and the time permitted for the treatment to be completed. The stronger the acid (i.e. the lower the pH) the lower the temperature required. The higher the temperature the shorter the treatment time. In some embodiments the reactor is pressurized with $CO_2$ gas to a pressure in excess of 1 atmosphere prior to heating.

For example $CO_2$ may be bubbled through a pulp slurry to produce a pH in the range of ~3 to ~4. The reactor may then be sealed and heated to 220° C. for 1 hour to produce a solid biofuel material. The biofuel may be separated from the liquids by suitable filtration, dried and pressed into pellets, briquettes or the like.

Where biofuels are a desired end product, useable chemicals such as glucose and/or organic compounds may optionally be taken off. The organic compounds produced may, for example, comprise levulinic acid, formic acid and/or 5-hydroxymethyl furfural. These compounds may be separated and purified and then may be sold or used. Glucose may be purified and sold or used or may be fermented to ethanol using, for example, *Saccharomyces cerevisiae*.

Figure 4:
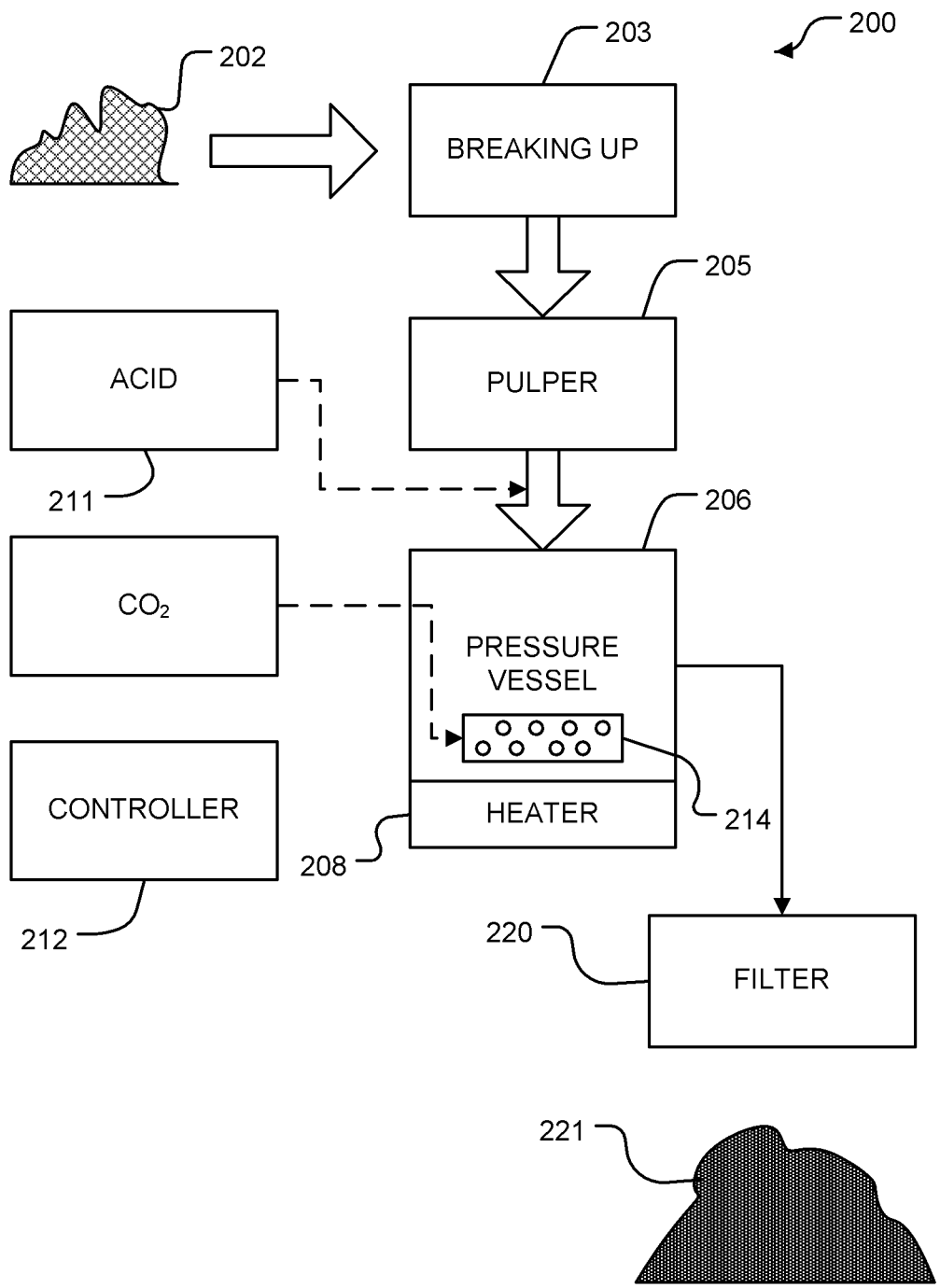
FIG. 4 is a schematic diagram illustrating a batch plant for making solid fuels and/or useful chemicals.

FIG. 4 is a schematic diagram of a batch mode apparatus 200 according to an example embodiment. Feedstock 202 enters a breaking-up stage 203 wherein the feedstock is divided into a comminuted form. Breaking-up stage 203 may comprise a suitable chopper, shredder, mulcher or the like. The comminuted feedstock is introduced into a pulper 205 where it is mixed with water or another aqueous solvent and agitated to form a slurry. The slurry is piped into a pressure vessel 206 equipped with a heater 208.

Either before or after entering pressure vessel 206, the slurry is made acidic. This may be done by one or more of: adding acid 211 to the slurry and contacting the slurry with $CO_2$. In some embodiments $CO_2$ gas is sparged through the slurry from a submerged sparger 214. After pressure vessel 206 is sealed, $CO_2$ gas may be added until the atmosphere in pressure vessel 206 comprises or consists of $CO_2$ at a pressure at or in excess of atmospheric pressure. In some embodiments the $CO_2$ is initially at a pressure of approximately 20 psi (above atmospheric pressure). It is desirable that the slurry have a pH of 5 or below.

A process controller may be provided to control some or all aspects of the operation of the processes performed by apparatus 200. In the illustrated embodiment a controller 212 monitors the pH, temperature and pressure of pressure vessel 206. Controller 212 may be connected to control heating of the contents of pressure vessel 206 to raise and maintain the temperature of the slurry to a temperature in the range of about 170° C. to 300° C. Controller 212 may maintain pressure within the heated pressure vessel 206 in the range of 50 psi to 800 psi for example. The heating may continue until substantially all cellulose in the slurry has been hydrolyzed into sugars and the sugars have combined to form organic polymers. Controller 212 may optionally be connected to valves and the like to control the flow of slurry through the process.

After heating, the treated slurry is removed from the pressure vessel and the solid polymers are separated from remaining liquid in filtering stage 220. The liquids may be recycled for use in processing another batch of feedstock. Solids may be packaged or processed for downstream applications. For example, filtered solids 221 may be dried and pelletized for use as a fuel.

In some embodiments, control over heating is achieved, at least in part, in response to a monitored level of glucose within the pressure vessel. Glucose concentration may be monitored using a suitable sensor inside the pressure vessel or in a location to which fluids from within the pressure vessel can be bled. In some embodiments glucose is monitored by monitoring a near-infrared spectrum of the material in the pressure vessel (either as a continuous spectrum or in one or more frequency bands characteristic of the presence of glucose). The concentration of glucose in solution is expected to rise initially as cellulose is converted to glucose. Once all the initial feedstock has been processed the glucose level will start to drop. A controller connected to receive a signal indicative of the glucose concentration may be configured terminate the heating in response to detecting the drop in the glucose level, detecting an initial rise in the glucose level followed by a drop and/or detecting that the glucose level has fallen below a threshold, for example.

In a more specific example embodiment, a pressure vessel containing an aqueous slurry of a cellulose material is heated a temperature in the range of 200° C. to 300° C. for a period of minutes to a few hours. Typical conditions are 230° C. for 45 minutes. Under the reaction conditions the cellulose becomes hydrated to form glucose. The glucose reacts to form a number of chemicals and reversion products which may include 2,5 hydroxy methyl furfuraldehyde, levoglucosan and polycyclic derivatives of 2,5-HMF. The HMF can be removed by contact with a non-aqueous phase like MEK or allowed to react further to form polycyclic derivatives of HMF that form solids that are hydrophobic and have an excellent energy density. Where a main desired end product is a solid fuel then the reaction conditions are maintained for a time sufficient for at least most of any HMF produced to react further. It is desirable that the slurry be stirred or agitated during treatment to keep the temperature uniform and to ensure that all of the cellulose (and other polysaccharides) have an opportunity to react.

Figure 5:
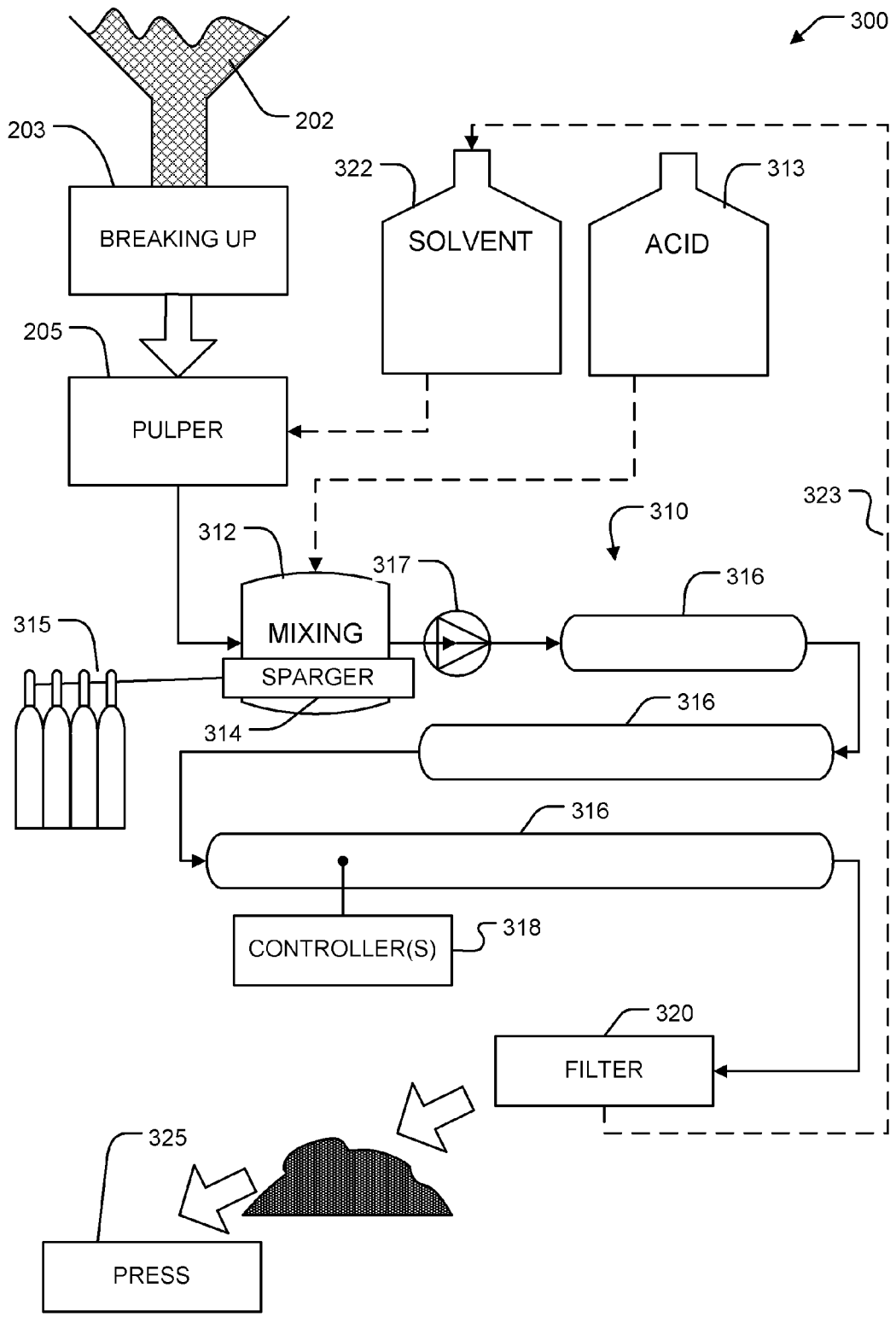
FIG. 5 is a schematic diagram illustrating a continuous plant for making solid fuels and/or useful chemicals.

FIG. 5 is a schematic diagram of a continuous mode apparatus 300 according to another example embodiment. Feedstock 202 enters a breaking-up stage 203 wherein the feedstock is divided into a comminuted form. Breaking-up stage 203 may comprise a suitable chopper, shredder, mulcher or the like. The comminuted feedstock is introduced into a pulper 205 where it is mixed with water or another aqueous solvent and agitated to form a slurry.

The slurry is fed through a vessel in conversion stage 310. The slurry is made acidic by mixing acid with the slurry and/or by contacting the slurry with $CO_2$. The illustrated apparatus 300 includes a mixing vessel 312 upstream from conversion stage 310 into which acid may be mixed from an acid supply 313. A sparger 314 is connected to a source of $CO_2$ 315 to permit fine bubbles of $CO_2$ to be sparged through the slurry in mixing vessel 312. An agitator or other mixing mechanism may be provided to mix the slurry present in mixing vessel 312.

The acidic slurry is delivered to conversion stage 310 by a pump 317. Conversion stage 310 comprises one or more pressure vessels 316. The acidic slurry is heated in conversion stage 310 for the duration of time it takes the slurry to pass from one end of pressure vessels 316 to the other. Controllers 318 monitor the pH, temperature and pressure of the slurry in vessel 316.

If the pH rises above a threshold then controllers 318 may trigger the addition of acid into mixing vessel 312 and/or vessel 316. Controllers 318 may be configured to maintain the temperature and pressure of the slurry in the range of, for example, 175° C. to 300° C. and 50 psi to 800 psi respectively in vessel 316. Controllers 318 may be connected to control pumps, valves or other metering devices for adding solvent, acid and/or carbon dioxide to the process. Controllers 318 may also be connected to control heating of vessel(s) 316.

The treated slurry emerging from vessel 316 is cooled and subjected to a liquid/solid separation. for example, solids may be separated by filtering. A filtration stage 320 is shown in FIG. 5. Liquids may be recycled in the process. In the illustrated embodiment, liquids are returned to solvent supply 322 by way of line 323. After filtering, the solids may be further dried by, for example, air drying, pressing or the like. A press 325 is shown in FIG. 5.

The resulting solids may be processed into a form suitable for use as a fuel. For example, the solids may be pressed into pellets or briquettes or the like; used as a binder to bind together particles of coal, wood, or another fuel material; mixed with another fuel material and then pressed into pellets or briquettes or the like etc.

Figure 6:
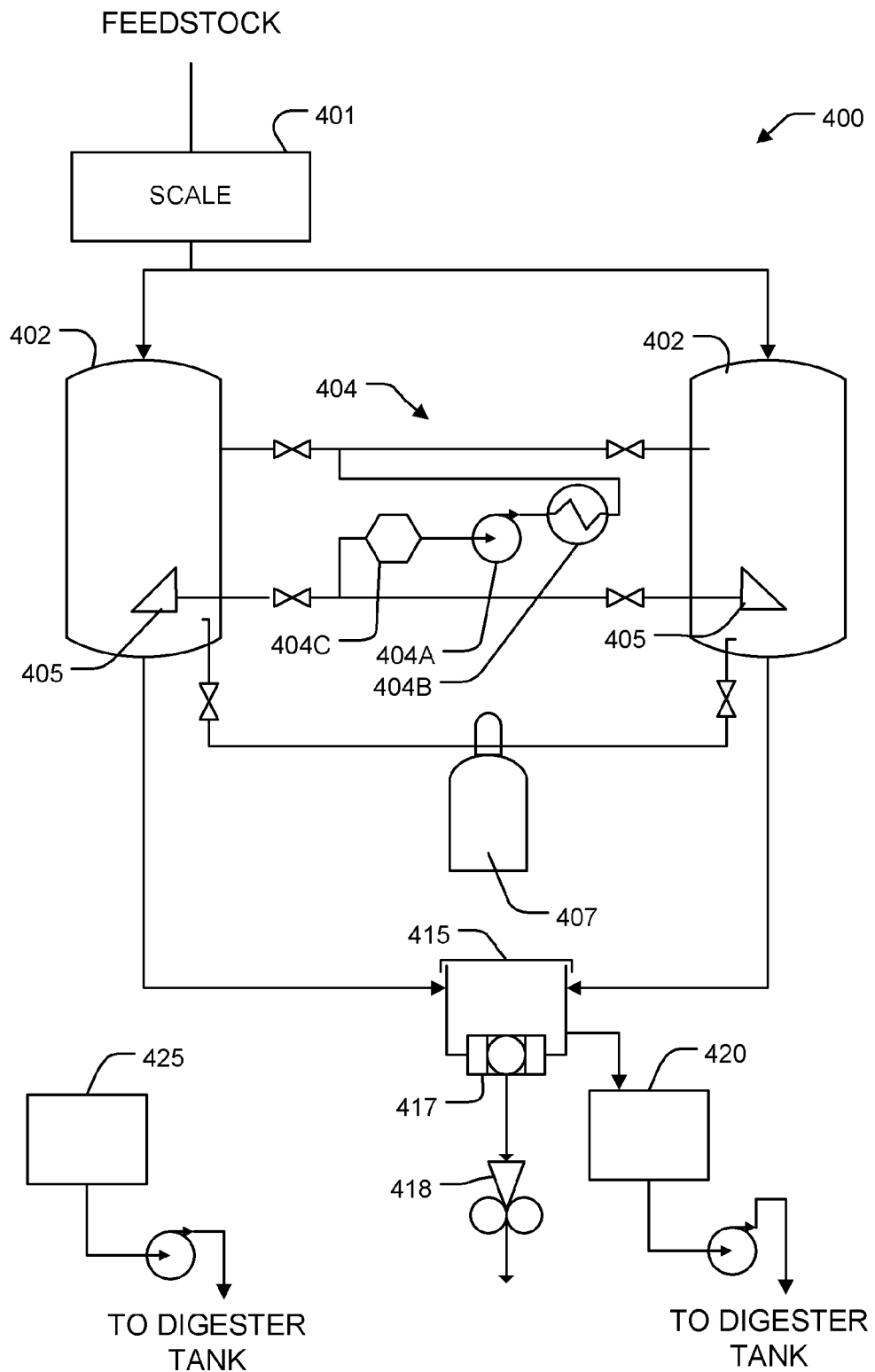
FIG. 6 is a schematic diagram illustrating a batch plant having dual processing vessels.

FIG. 6 shows another example apparatus 400 that may be applied in the production of biofuels as described herein. Pulped feedstock is delivered by way of a scale 401 to one of two digester tanks 402. Each digester tank 402 may have a capacity of 3800 L, for example. Digester tanks 402 may be operated in tandem or one digester tank may be operated while the other is being filled or emptied. The contents of digester tanks 402 may be heated by circulation through a heating loop 404 comprising circulation pump 404A and heat exchanger 404B. Heat exchanger 404B may be heated with steam for example.

An infrared port 404C permits the chemical makeup of the circulating slurry to be monitored by suitable instrumentation (an infrared spectrometer, for example). Screens 405 prevent larger solids from being drawn through heating loop 404.

A gas supply (for example a supply 407 of $CO_2$ gas may be provided. Gas from supply 407 may be selectively introduced into tanks 402 for purposes of adjusting the pH of slurry contained in the digester tank and/or agitating the contents of the tanks.

After the contents of a digester tank 402 have been cooked sufficiently, the contents may be transferred to a slurry tank 415. A fine screen filter 417 separates solids from liquids in the slurry. The solids pass to a pelletizer 418 which presses the solids into pellets suitable for use as a fuel. Fluids pass to a liquor tank 420 from which they can be transferred back into a digester tank 402 during filling of the digester tank 402.

A catalyst tank 425 contains an acid or other material that catalizes or otherwise facilitates the conversion of feedstock into poly carbon compositions suitable for use as a biofuel. Suitable process controllers (not shown in FIG. 6) may be configured and connected in a standard manner to automate the operation of the overall process or parts thereof.

The solid polycarbon biofuel that can be produced by the processes described herein comprises hydrophobic polycyclic derivatives of 2,5-HMF. In some embodiments the solid polycarbon biofuel has an average molecular weight in the range of approximately 1000 to 1500 or 2000 grams per mole. Some polycarbon molecules, especially those that are less than about 1000 grams per mole, tend to be soluble in acetone and can be separated by dissolving in acetone or another suitable solvent. In some embodiments, short chained polycarbon molecules are dissolved in a suitable solvent and taken off to be processed to produce a liquid bio-fuel, if desired.

Short chain polycarbon molecules that are not filtered out may be returned to the process with the separated liquid. Such soluble polycarbon chains can react with one another and fresh feedstock to form solids when the fresh feedstock is processed in a slurry which includes the recycled water and short chain polycarbon molecules. The recycling saves energy and reduces or avoids the need to dispose of wastewater.

In the methods described above, whether or not practised using the apparatus described above, the nature of the end products can be altered by altering the process conditions. For example:
1. The solids loading of a slurry may be varied. In some embodiments the solids content of the slurry is in the range of about 1% to 20% by weight solids. The higher the solids loading, the higher is the concentration of cellulose during treatment and the more polycyclic solids are formed. Lower concentrations favour glucose and HMF as reaction products. Where the desired end product is a solid fuel then it is desirable to make the slurry relatively concentrated (for example having a solids content of 10% or more) and it is desirable that the feedstock be high in cellulose and/or hemicellulose.

2. The processing temperature may range from 200° C. or somewhat lower to 300° C. or 350° C. Process temperatures in the range of 220° to 260° C. are typical. The lower the temperature the longer the time required for complete hydrolysis of cellulose to final products. Higher temperatures favour the formation of polycyclic carbon compounds. Lower temperatures favour glucose and HMF as reaction products. Where the desired end product is a solid fuel then it is desirable to use temperatures that are relatively high, for example, at least about 250° C. Where the pH is relatively high then cooking temperatures toward the higher end of the range may be desired as the reaction rate tends to decrease as pH is increased.

3. The atmosphere in a pressure vessel during treatment and whether or not an acid is added to the slurry can affect the end products. With a $CO_2$ atmosphere in a pressure vessel above the slurry, $CO_2$ dissolves in the slurry to provide $H_2CO_3$ which is a strong enough acid to hydrate cellulose molecules and to convert the resulting glucose to 2,5-HMF. The conditions provided by $CO_2$ dissolved in the slurry are not sufficiently acidic to convert 2,5-HMF to levulinic and formic acids. The conditions are such that the 2,5-HMF tends to degrade to polycyclic derivatives of 2,5-HMF instead. Where the desired end product is a solid fuel then it is desirable that the slurry be only weakly acidic (e.g. pH of about ~3 to ~4) as, for example, can be achieved by contacting the slurry with $CO_2$. 4. The longer the processing time the more polycyclic solids are formed. The shorter the processing time the less polycyclic solids are formed. Shorter processing times favour the production of glucose and 2,5-HMF. Where the desired end product is a solid fuel then it is desirable that the processing time not be too short.

6. The introduction of a secondary catalyst such as iron or steel may increase the production of polycarbon solids. The choice of tank material may also affect the production of polycarbon solids. Stainless steel tanks that are corrosion resistant will still assist in the catalyzation of the materials in solution to polycarbon solids. Where the desired end product is a solid fuel then it may be desirable to use a steel or stainless steel pressure vessel and/or provide a catalyst such as an iron or steel catalyst member in the pressure vessel. Advantageously an iron-containing catalyst may help to break down aromatic compounds that may be present in the feedstock (as might occur, for example, where the feedstock comprises wood treated with creosote or another aromatic-containing preservative).

EXAMPLES

Example 1

1240 ml of a 240 mM HCl solution was added to 150 grams of hemlock pulp chips and sealed into a pressure vessel. The pressure vessel was heated to 200° C. for 2 hours. The yield was 63.4 g of biofuel. This represented a yield of 45%. The energy density of the biofuel was 30 GJ/Tonne.

Example 2

389 grams of cellulose and 6000 ml of 100 mM Maleic Acid were placed in a pressure vessel. The pressure vessel was then heated to 200° C. for 300 minutes. Glucose yield was 65 grams and the yield of solid biofuel polycarbon or humins was 75 grams.

Example 3

200 grams of Hemlock chips containing 70% solids were placed in a pressure vessel with 800 ml of an aqueous solution made by bubbling $CO_2$ through water for 5 minutes. The solid loading was calculated to be 15% solids. The pressure vessel was sealed and flushed with $CO_2$ to provide a $CO_2$ atmosphere above the solution. The sealed pressure vessel was placed into a convection oven and heated to 236° C. for 120 minutes. At temperature the pressure within the pressure vessel was 450 psi. The pressure vessel was then cooled in air to 30° C. and opened. The treated slurry was filtered to separate solids from liquids. The solids were dried and were found to weigh 73.04 gms. The yield was calculated to be 61.2% of dried solids were converted to bio-fuel. The dried solids were tested using ASTM D240 at an independent laboratory and found to have an energy density of 13,100 BTU/lb. This compares well with Powder River Basin coal (low $SO_2$) having an energy density of 8,500 BTU/lb. and Appalachian bituminous coal (high $SO_2$) having an average energy density of 12,500 btu/lb. The sulphur content of the biofuel produced was measured to be less than 315 PPM. The source material was dried to bone dry in an oven at 60° C. and measured for energy density at an independent lab using ASTM D240. The energy density was measured to be 9060 BTU/lb. The process increased the mass energy density by a factor of 1.45 times.

Example 4

213.672 grams of Hemlock chips containing 70% solids were placed in a pressure vessel with 800 ml of an aqueous solution made by bubbling $CO_2$ through water for 5 minutes. The solid loading was calculated to be 17% solids. The pressure vessel was sealed and flushed with $CO_2$ giving a $CO_2$ atmosphere above the slurry. The sealed pressure vessel was placed into a convection oven and heated to 236° C. (at which point the pressure in the pressure vessel was 450 PSI) for 90 minutes. The pressure vessel was then cooled in air to 30° C. at which point it was opened and the treated slurry was filtered to separate solids from liquids. The solids were dried and were found to weigh 98.971 g. The yield was calculated to be 72.3% of dried solids were converted to bio-fuel. The dried solids were tested using ASTM D240 at an independent lab and found to have an energy density of 12,000 BTU/lb. The source material was dried to bone dry in an oven at 60° C. and measured for energy density at an independent lab using ASTM D240. The process increased the mass energy density by a factor of 1.33 times.

Example 5

200 g of Hemlock pulp chips (60% dry solids) were placed in a 1.25 l bioreactor and 800 ml of carboxylated water was added. The chip solids loading was 15% dry solids. The bioreactor was then flushed with $CO_2$ and sealed. The bioreactor was placed in an oven and heated to 250° C. The heating and cook time combined was 3.5 hours. The bioreactor was allowed to cool and then opened. The was significant gas evolution. The glucose content was 38 mM/L. The solids were dried and weighed. 61 grams of a black solid polycarbon biofuel was produced. The gas evolution suggests that a shorter cook time may have produced an improved yield of biofuel.

Example 6

10 g of biofuel produced as described herein was mixed with 10 g of char and pressed into a pellet 1.5" in diameter and ¼" thick using a 5 tonne press. The solid pellet did not give off dust and burned well giving a 27 GJ/Tonne energy density.

Example 7 biofuel produced as described herein was mixed 1:1 with coal dust and pressed into a pellet 1.5" in diameter and ¼" thick using a 5 tonne press. The solid pellet did not give off dust.

Figure 7:
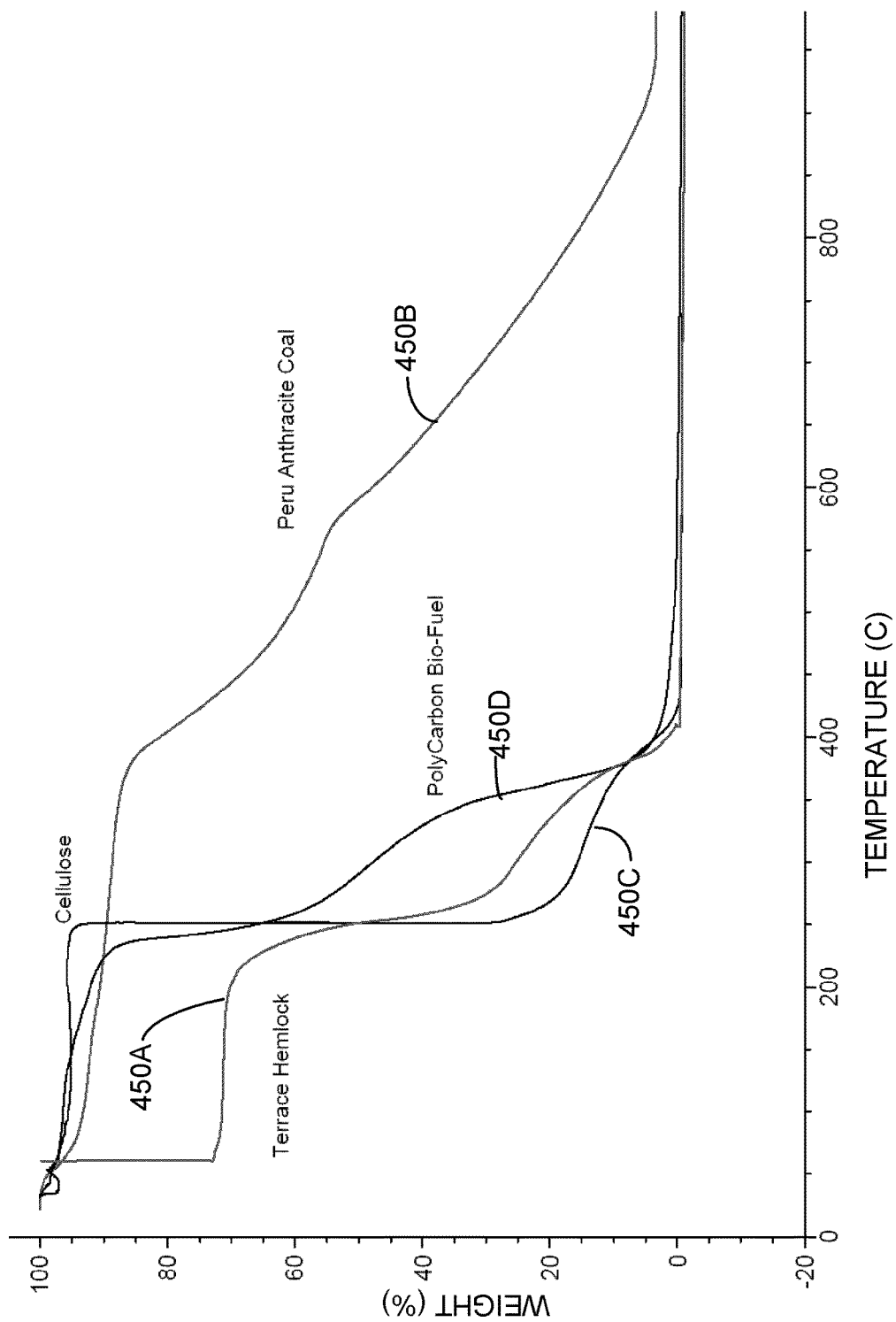
FIG. 7 is a plot showing weight loss as a function of temperature for various fuels including a biofuel produced according to one embodiment.

FIG. 7 is a graph which includes plots of weight as a function of temperature for hemlock wood (curve 450A), anthracite coal (curve 450B), cellulose (filterpaper) (curve 450C) and biofuel produced as described herein (curve 450D). It can be seen from curve 450D that the biofuel has a temperature of volatilization significantly lower than that of coal. The large drop in mass of wood at low temperatures seen in curve 400A results from drying of the wood.

Figure 8:
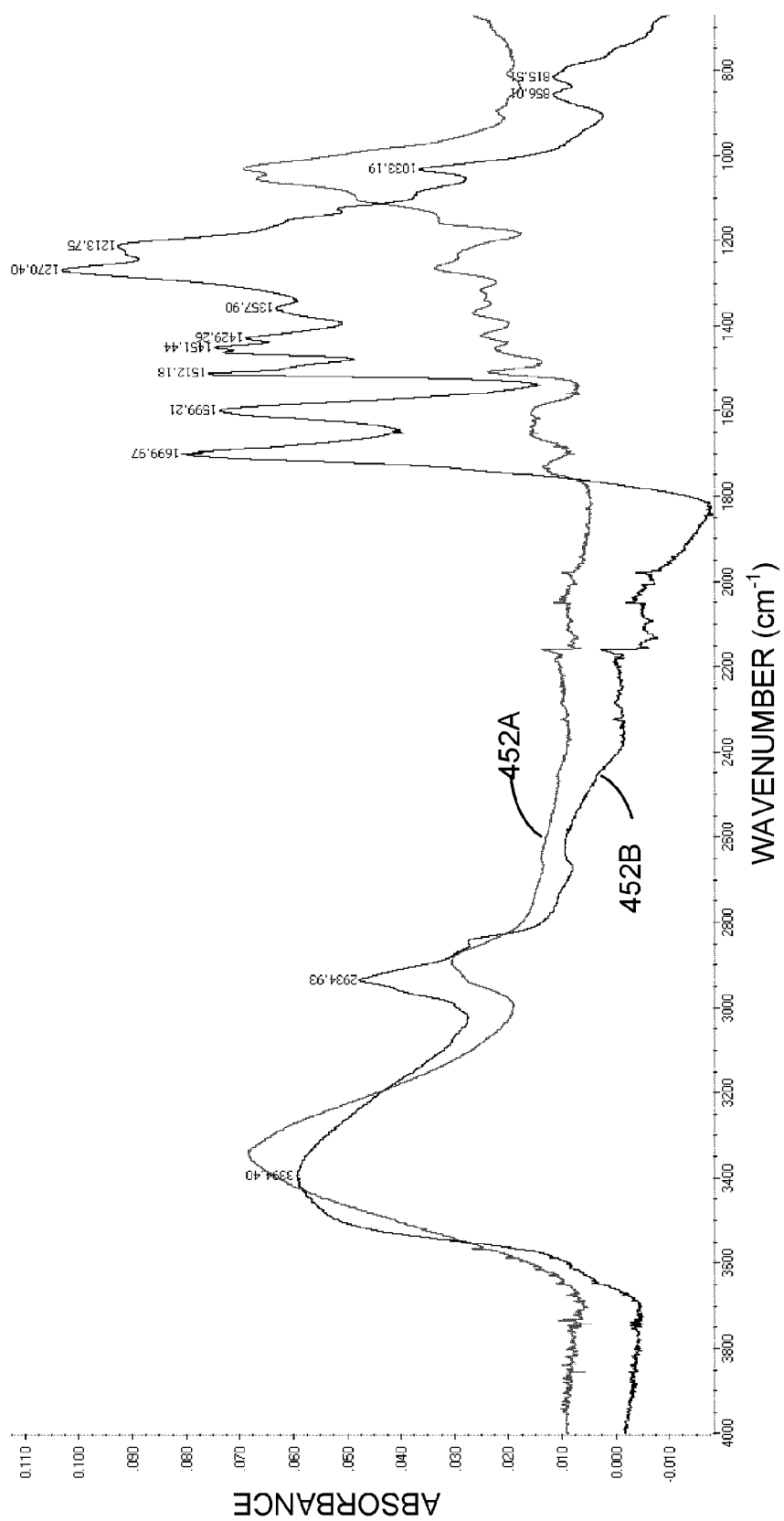
FIG. 8 is a FTIR spectrum of wood chips and a biofuel made from the wood chips.

FIG. 8 shows Fourier Transform Infrared Spectroscopy (FTIR) results for hemlock wood chips (curve 452A) and a biofuel (curve 452B) made from hemlock wood chips as described herein using a slurry saturated with $CO_2$, (carbonic acid) and a treatment at 230° C. for 3 hours. The energy content of the biofuel was 30 GJ per Tonne.

While the inventor does not wish to be bound by any specific theory, it is thought that the biofuels made in at least some embodiments are made by a mechanism which involves the dehydration of a sugar to a cyclic ether compound and the subsequent polymerization of the ether compound to a complex solid polymer.

Some embodiments may provide one or more of the following advantages (it is not mandatory that any particular embodiment provide any of these advantages):

Reaction conditions of temperature and pressure may be much more mild than would be the case if the reaction conditions were required to provide supercritical water (temperatures exceeding 372° C. and pressures exceeding 3216 psi).

A solid fuel product may be produced that does not tend to absorb water or swell in the presence of moisture.

A solid fuel produced may be used as a binder for other fuel materials.

A solid fuel may be produced without the need to dry feedstock prior to processing.

A solid biofuel produced may be readily pelletized.

A solid biofuel produced may be burned on its own or mixed with other fuels such as coal, wood pellets, or the like.

A solid biofuel produced and supernatant fluids are sterilized by the process conditions. Pathogens, insects and other undesirable biological materials that may be present in the feedstock are eliminated.

Supernatant fluids may be recycled into the process and used again.

The process is tolerant to the presence of contaminants such as grease and plastic and therefore does not require meticulous upstream removal of such materials.

Solid biofuel produced may be burned in existing facilities such as coal burners and wood pellet burners either on its own or mixed with other fuel.

Where $CO_2$, is present during the reaction, the requirement for other acids can be reduced or eliminated and it may be unnecessary to neutralize the treated slurry.

Solid biofuel produced contains oxygen and tends to burn cleanly. In some embodiments the biofuel has an oxygen content of approximately 0.37 by weight. In some embodiments, the biofuel has an elemental composition comprising 3 oxygen atoms for each 6 carbon atoms.

The technology described herein may be applied in combination with features described in U.S. application No. 61/174,466 filed on 30 Apr. 2009 and entitled PROCESS AND APPARATUS FOR RECYCLING COATED PAPER PRODUCTS as well as the corresponding PCT patent application of the same title being filed simultaneously herewith, both of which are hereby incorporated herein by reference. Where it is desired to produce a biofuel, it is not mandatory to separate particles of any coating materials that may have been present in the feedstock (although this can be done in some embodiments). The biofuel material may include small plastic coating particles (e.g. pieces of coating having dimensions of about 1 mm to 2 mm or less). The biofuel (including any plastic) may be separated by suitable filtration, dried and pressed into pellets, briquettes or the like.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations.

What is claimed is:

1. A method of producing a solid bio-fuel from a feedstock comprising one or more of a polysaccharide, hemicellulose, cellulose and lignin, the method comprising:
   providing an aqueous slurry of the feedstock;
   making the slurry acidic; and
   cooking the slurry at a temperature in the range of 170° C. to 300° C. and a pressure in excess of atmospheric pressure for a time sufficient to cause one or more of the polysaccharide, hemicellulose, cellulose and lignin to react to yield solid hydrophobic polycarbon compounds comprising polycyclic derivatives of 2,5-hydroxymethylfurfuraldehyde.

2. A method according to claim 1 wherein making the slurry acidic comprises sparging $CO_2$ through the slurry.

3. A method according to claim 1 wherein cooking the slurry is performed in a pressure vessel and the method comprises filling a headspace area within the pressure vessel with $CO_2$ prior to cooking the slurry.

4. A method according to claim 1 wherein making the slurry acidic comprises adding an acid to the slurry.

5. A method according to claim 4 wherein the acid comprises an organic acid.

6. A method according to claim 5 wherein the organic acid comprises an acid selected from the group consisting of carbonic, formic, maleic, oxalic acids and mixtures of one or more thereof.

7. A method according to claim 5 wherein the organic acid comprises an acid selected from the group consisting of carbonic, formic, acetic, maleic, malic, malonic, oxalic acids and mixtures of one or more thereof.

8. A method according to claim 5 wherein the organic acid comprises an acid having a pKa in the range of 1.5 to 3.85.

9. A method according to claim 4 wherein the acid comprises an inorganic acid.

10. A method according to claim 9 wherein the inorganic acid comprises an acid selected from the group consisting of sulphuric, hydrochloric, hydrobromic, nitric and phosphoric acids and combinations thereof.

11. A method according to claim 1 wherein the cooking is performed for a time in the range of 5 to 180 minutes.

12. A method according to claim 1 comprising exposing the slurry to a solid catalyst while cooking the slurry.

13. A method according to claim 12 wherein the solid catalyst comprises iron or steel.

14. A method according to claim 1 wherein the feedstock comprises one or more of: polysaccharides, cellulose, hemicellulose, lignin, a sugar, wood chips, sawdust, bark, chips of pine, hemlock, cedar, fir, spruce, birch, alder, aspen, or balsam, forest cuttings, branches, leaves, wood demolition waste, pulp, paper, plant biomass, water hyacinth, milfoil weeds, grasses, marine plants, algae, cyano-bacteria, agricultural wastes, straw, plant cuttings, corn cobs, corn stover, animal manure, horse manure, cow manure, pig manure, bagasse, oil palm trunks, rice husks, municipal wastes, food waste, yard waste, coffee grounds, kitchen waste, paper-based disposable cups and plates, waste paper, waste cardboard, food packaging, juice containers, coated cardboard drinking cups, sewage sludge, brewers' waste, and mixtures of one or more thereof.

15. A method according to claim 1 comprising separating the polycarbon compounds from the slurry by filtration and pressing the polycarbon compounds into pellets.

16. A method according to claim 15 comprising mixing the polycarbon compounds with a comminuted fuel prior to pressing the polycarbon compounds into pellets.

17. A method according to claim 16 wherein the comminuted fuel comprises coal or wood.

18. A method according to claim 1 wherein the polycarbon compounds are substantially completely volatile at a temperature below 500° C.

* * * * *